United States Patent [19]

Shimada et al.

[11] Patent Number: 5,621,558
[45] Date of Patent: Apr. 15, 1997

[54] LIQUID CRYSTAL ELECTRO-OPTICAL DEVICE HAVING ALIGNMENT FILMS FOR PERPENDICULAR ALIGNMENT

[75] Inventors: Shinji Shimada, Kashihara; Kiyoshi Ogishima, Nara, both of Japan

[73] Assignee: Sharp Kabushiki Kaisha, Osaka, Japan

[21] Appl. No.: 423,990

[22] Filed: Apr. 18, 1995

[30] Foreign Application Priority Data

Apr. 20, 1994 [JP] Japan ................................. 6-081888
Oct. 21, 1994 [JP] Japan ................................. 6-257149

[51] Int. Cl.⁶ .......................... G02F 1/1337; G02F 1/13
[52] U.S. Cl. ........................................ 349/130; 349/180
[58] Field of Search ............................ 359/77, 102, 63

[56] References Cited

U.S. PATENT DOCUMENTS 3,914,022  10/1975  Kashnow ............................ 359/102
4,490,015  12/1984  Kawarada et al. ................. 359/102
5,093,741   3/1992  Shohara et al. ..................... 359/85
5,420,233   5/1995  Isogai et al. ........................ 528/353
5,477,358  12/1995  Rosenblatt et al. ................. 359/77

FOREIGN PATENT DOCUMENTS 58-116518  7/1983  Japan .
62-38421   2/1987  Japan .
3-209440   9/1991  Japan ................................. 359/102
4-294323  10/1992  Japan ................................. 359/102

OTHER PUBLICATIONS

Y. Toko et al. "TN–LCDs Fabricated by Non–Rubbing Showing Wide and Homogeneous Viewing Angular Characteristics and Excellent Voltage Holding Ratio", SID 93 Digest, pp. 622–625.

Y. Iimura et al. "Electro–Optic Characteristics of Amorphous and Super–Multidomain TN–LCDs Prepared by a Non–Rubbing Method", SID 94 Digest, pp. 915–918.

Primary Examiner—William L. Sikes
Assistant Examiner—Charles Miller
Attorney, Agent, or Firm—David G. Conlin; George W. Neuner

[57] ABSTRACT

According to the present invention, a liquid crystal electro-optic device is provided. The liquid crystal electro-optic device includes a pair of insulating substrates disposed to face each other; a liquid crystal layer sandwiched between the insulating substrates; and a pair of alignment films respectively formed on the insulating substrates to be in contact with the liquid crystal layer. The orientations of liquid crystal molecules in the liquid crystal layer, which are in contact with the pair of alignment films, are aligned in a direction substantially perpendicular to the pair of insulating substrates, and the liquid crystal layer has a twist pitch of approximately quadruple the thickness of the liquid crystal layer.

11 Claims, 6 Drawing Sheets

LIQUID CRYSTAL ELECTRO-OPTICAL DEVICE HAVING ALIGNMENT FILMS FOR PERPENDICULAR ALIGNMENT

BACKGROUND OF THE INVENTION

1. Field of the Invention

The present invention relates to a liquid crystal electro-optic device utilizing the electro-optic characteristics of liquid crystal, a projection-type display system employing the same, and a method for driving the same. Such a liquid crystal electro-optic device and a projection-type display system are used for displays and information processors, for example.

2. Description of the Related Art

In liquid crystal (LC) electro-optic devices, display is effected by changing the orientation of LC molecules contained in an LC layer interposed between a pair of substrates and utilizing the resultant change in the optical refractive index of the LC layer.

One of such LC electro-optic devices is a TN-LC electro-optic device using twisted nematic (TN) liquid crystal having a positive dielectric anisotropy. The LC molecules contained in an LC layer of this device are aligned so that the major axes of the LC molecules are parallel to the surfaces of a pair of substrates and that the orientations of such LC molecules are twisted by 90° along the thickness of the LC layer between the pair of substrates. With this alignment, an LC panel where light propagating therethrough is rotated by 90° is realized. When such an LC panel is applied with a voltage, the major axes of the LC molecules are aligned in a direction of the applied electric field, reducing the rotatory power of the propagating light. When the LC panel is applied with a high voltage above a threshold, the LC molecules are aligned in a direction perpendicular to the surfaces of the pair of substrates. At this state, the rotatory power of the propagating light is substantially lost. By disposing a pair of polarizers so as to sandwich the LC panel, this change in the rotatory power of the propagating light through the LC panel is expressed as a change in the light transmittance. Display is thus realized by using this effect.

The above TN-LC electro-optic device has a disadvantage: Since LC molecules have refractive index anisotropy (birefringence), the display contrast of the LC electro-optic device varies with the viewing angle at which a viewer views the device.

As one example of liquid crystal displays (LCDs) exhibiting improved viewing angle dependency of the display contrast, S. Kobayashi et al. of Tokyo University of Agriculture and Technology propose an amorphous TN-LCD (SID 93 DIGEST, pp. 622–625). This amorphous TN-LCD improves the viewing angle dependency of the display contrast in the following manner.

Layers made of a polymer normally used as alignment films are formed on a pair of substrates. The surfaces thereof are not rubbed. Liquid crystal doped with a chiral dopant so that the twist pitch of the liquid crystal is approximately quadruple the thickness of an LC layer is injected into a space between the pair of substrates in an isotropic phase. In the thus-fabricated LC cell, the orientations of LC molecules in the LC layer are twisted. The orientation of the LC molecules at the interfaces with the substrates are not uniform, but are different from one another, though in an orderly manner. These different but orderly orientations of the LC molecules provide good viewing angle characteristic.

In the above amorphous TN-LC electro-optic device, the viewing angle characteristic exhibits a substantially conical shape having a center axis along the normal of the LC cell. Also, a phenomenon of inverted display is prevented over a comparatively wide range of viewing angles.

The above conventional amorphous TN-LC electro-optic device has disadvantages as follows: (1) The orientations of the LC molecules at the interfaces with the substrates are not uniform, but are different from one another in an orderly manner as described above. Accordingly, the orientations of the LC molecules at the interfaces with the substrates are not identical to the polarizing axes of polarizers. (2) The LC molecules in the vicinity of the interfaces with the substrates are not easily driven. Accordingly, the birefringence of the LC molecules at and near the interfaces remains until a high voltage is applied to the LC layer. As a result, the display contrast is low, compared with TN-LC electro-optic devices. In order to obtain a high contrast, a high driving voltage is required.

SUMMARY OF THE INVENTION

The liquid crystal electro-optic device of this invention, includes a pair of insulating substrates disposed to face each other; a liquid crystal layer sandwiched between the pair of insulating substrates; and a pair of alignment films respectively formed on the pair of insulating substrates to be in contact with the liquid crystal layer, wherein orientations of liquid crystal molecules in the liquid crystal layer, which are in contact with the pair of alignment films, are aligned in a direction substantially perpendicular to the pair of insulating substrates, and wherein the liquid crystal layer has a twist pitch of approximately quadruple the thickness of the liquid crystal layer.

In one embodiment, the liquid crystal layer includes a nematic liquid crystal having a negative dielectric anisotropy.

In another embodiment, the liquid crystal layer includes a liquid crystal doped with a chiral dopant to make the orientations of the liquid crystal molecules in the liquid crystal layer twisted.

In still another embodiment, the orientations of the liquid crystal molecules are twisted by substantially 90 degrees along the thickness of the liquid crystal layer when an electric field is applied to the liquid crystal layer.

In still another embodiment, the pair of alignment films are vertical alignment films for aligning the orientations of the liquid crystal molecules which are in contact with the vertical alignment films, one of the vertical alignment films is rubbed in a first direction, the other of the vertical alignment films is rubbed in a second direction, and the vertical alignment films are arranged so that the first direction is shifted from the second direction by substantially 90 degrees.

In still another embodiment, the pair of alignment films are formed of a material which contains polyimide having a side chain.

In still another embodiment, the liquid crystal electro-optic device includes a pair of polarizers disposed to sandwich the pair of the insulating substrate, the pair of polarizers being arranged so that polarizing axes thereof are substantially perpendicular to each other.

In still another embodiment, one of the polarizing axes of the pair of polarizers is substantially parallel to the first direction and the other of the polarizing axes of the pair of polarizers is substantially parallel to the second direction.

In still another embodiment, the thickness of the liquid crystal layer is in the range of 20 to 35% of the twist pitch.

The projection-type display system of this invention, includes a light source, an electro-optic device for receiving light from the light source and displaying an image, and a projection lens for projecting the image displayed by the electro-optic device, the light source and the projection lens being disposed to sandwich the electro-optic device. The electro-optic device includes a pair of insulating substrates disposed to face each other; a liquid crystal layer sandwiched between the pair of insulating substrates; and a pair of alignment films respectively formed on the pair of insulating substrates to be in contact with the liquid crystal layer, wherein orientations of liquid crystal molecules in the liquid crystal layer, which are in contact with the pair of alignment films, are aligned in a direction substantially perpendicular to the pair of insulating substrates, and wherein the liquid crystal layer has a twist pitch of approximately quadruple the thickness of the liquid crystal layer.

The method for driving a liquid crystal electro-optic device of this invention, includes a step of applying a voltage across the liquid crystal layer, thereby the electric field which is equal to or less than 1.1 times the electric field providing the maximum transmittance of the liquid crystal layer is applied to the liquid crystal layer.

According to the LC electro-optic device of the present invention, LC molecules in the LC layer interposed between the pair of substrates each having an electrode and an alignment film are aligned in a direction substantially perpendicular to the pair of insulating substrates. The twist pitch of the liquid crystal is approximately quadruple the thickness of the LC layer. This structure is obtained by injecting chiral-dopant doped nematic liquid crystal having a negative dielectric anisotropy into a space between the pair of substrates with the alignment films for aligning the LC molecules perpendicularly formed thereon. The liquid crystal is doped with a chiral dopant so that the orientations of the LC molecules are twisted by approximately 90° along the thickness of the LC layer between the pair of substrates when the orientation of the LC molecules is changed to parallel to the substrates.

The pair of polarizers are disposed sandwiching the thus-obtained LC cell so that the polarizing directions are vertical to each other. By this arrangement, the LC molecules are aligned in a direction perpendicular to the substrates when an electric field is not applied to the LC layer, substantially eliminating the rotatory power and the birefringence of the LC layer. Thus, the polarizers block light from entering the LC cell, providing black display with extremely small transmittance. When a sufficiently large electric field is applied to the LC layer, the LC molecules are aligned in a direction parallel to the substrates. At the same time, since the LC layer has the chiral dopant doped therein, a Grandjean state is produced where the orientations of the LC molecules are twisted in the thickness direction of the LC layer. In this state, the LC layer has a rotatory power. Accordingly, the light utilization efficiency of the LC cell of the present invention is higher and significantly higher-luminance white display is obtained, compared with a conventional perpendicularly-aligned cell where the orientation of LC molecules is random, and that where the orientation of LC molecules is controlled to some extent by improvements on electrode structures and alignment films. Also, since black display is obtained at the non-application of an electric field, high-contrast display is possible at a low driving voltage.

When the alignment films are rubbed, the polarizers may be disposed so that the polarizing axis of each of the polarizers and the rubbing direction of the adjacent alignment film are parallel or vertical to each other, so as to obtain further improved contrast and brightness.

The contrast and the brightness can also be further improved by twisting the orientations of the LC molecules at the application of a voltage by approximately 90° along the thickness of the LC layer.

The contrast and the brightness can also be further improved by using perpendicularly-aligned films and rubbing the alignment films in directions different by 90° from each other.

Polyimide having a side chain is excellent in the reliability of the pretilt angle. Also, since any ionic substances are not seeped into the liquid crystal, it is also excellent in the reliability of the voltage retention representing the specific resistance of liquid crystal. When this polyimide having a side chain is used as the material for the alignment films, it is possible to provide an LC electro-optic device where the display quality does not deteriorate over a long-term use.

The transmittance can be increased by setting the thickness of the LC layer to be in the range of 20% to 35% of the twist pitch of the liquid crystal. Theoretically, 25% is optimal, but the above range is adopted because the LC molecules in the vicinity of the vertical alignment films are not easily driven by the application of an electric field.

The LC electro-optic device of the present invention can be effectively applied to a projection-type display system since a wide-range viewing angle characteristic is not required. The system may include a projection lens disposed on one side of the LC electro-optic device and a light source on the other side thereof, for projecting images on a display screen or the like.

The LC electro-optic device of the present invention is desirably driven with an electric field applied to the LC layer equal to or less than 1.1 times an electric field providing a maximum transmittance of the LC layer. At such a level of the electric field, the hysteresis phenomenon does not occur.

Thus, the invention described herein makes possible the advantages of (1) providing an LC electro-optic device capable of presenting high-luminance and high-contrast display with improved viewing angle dependency of display contrast, (2) providing a projection-type display system effectively utilizing the low driving voltage, high luminance, high contrast, and good viewing angle characteristic of the LC electro-optic device, and (3) a method for driving the LC electro-optic device capable of preventing the hysteresis phenomenon.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to the accompanying drawings.

EXAMPLE 1

Figure 1:
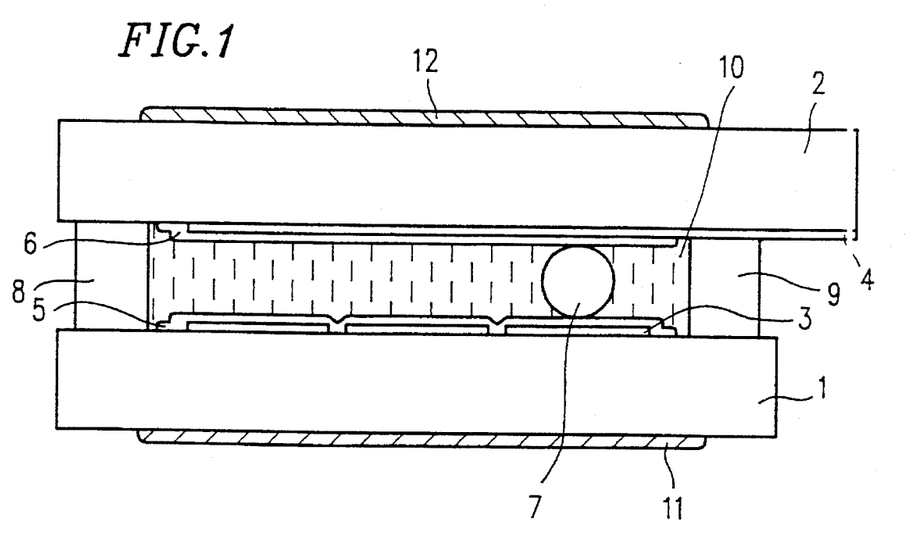
FIG. 1 is a sectional view of an LC electro-optic device according to the present invention.

FIG. 1 shows a structure of the LC electro-optic device as a first example according to the present invention. The LC electro-optic device of Example 1 includes a pair of substrates 1 and 2 disposed to face each other with spacers 7 therebetween, and an LC layer 10 interposed between the pair of substrates 1 and 2 with seals 8 and 9 sealing the periphery of the LC layer 10. The LC layer 10 is composed of n-type nematic liquid crystal doped with a chiral dopant so that the twist pitch of the liquid crystal is approximately quadruple the thickness of the LC layer 10. As the LC layer 10, liquid crystal having a negative dielectric anisotropy is used. Electrodes 3 and 4 are formed on the surfaces of the substrates 1 and 2 facing the LC layer 10. Alignment films 5 and 6 are formed over the entire surfaces of the substrates 1 and 2 facing the LC layer 10 so as to cover the electrodes 3 and 4. The alignment films 5 and 6 are arranged so that LC molecules in the LC layer 10 are aligned in a direction substantially perpendicular to the substrates 1 and 2. On the other surfaces of the substrates 1 and 2 apart from the LC layer 10 are formed polarizers 11 and 12 so that the polarizing axes thereof are vertical to each other. The thickness of the LC layer 10 is not necessarily 25% of the twist pitch of the liquid crystal, but may be in the range of 20% to 35%.

Figure 7:
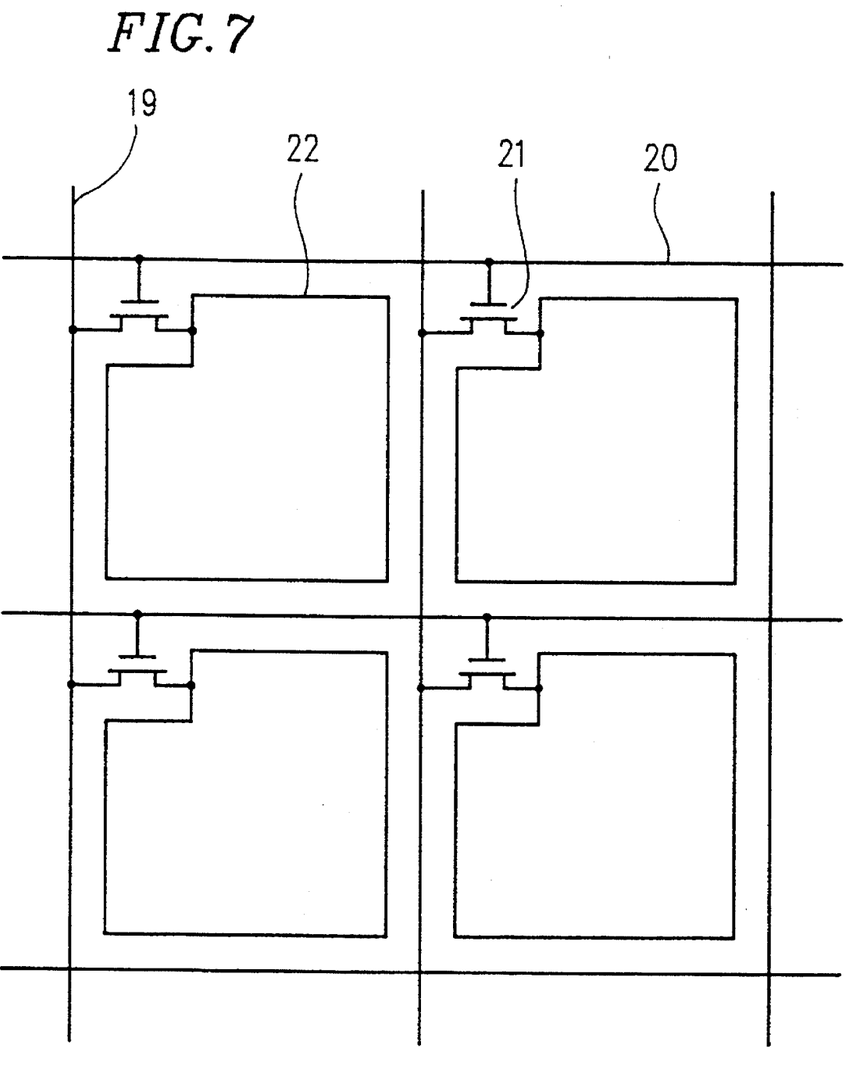
FIG. 7 is a plan view of an active matrix substrate as one of a pair of substrates of the LC electro-optic device of FIG. 1.

FIG. 7 shows an active matrix substrate as the substrate 1 of the LC electro-optic device according to the present invention. The active matrix substrate 1 includes a plurality of source bus lines 19 and a plurality of gate bus lines 20 arranged to intersect each other, for example, at right angles. Thin film transistors (TFTs) 21 as switching elements are formed in the vicinity of the crossings of the bus lines 19 and 20. A source electrode of each of the TFTs 21 is connected to 10 the adjacent source bus line 19, while a gate electrode thereof is connected to the adjacent gate bus line 20. A drain electrode of each of the TFTs 21 is connected to an adjacent pixel electrode 22 formed in an area defined by the adjacent two source bus lines 19 and the adjacent two gate bus lines 20. The pixel electrode 22 corresponds to the electrode 3 of the LC electro-optic device shown in FIG. 1.

A counter electrode as the electrode 4 shown in FIG. 1 is formed over the substantially entire surface of a counter substrate as the substrate 2 facing the active matrix substrate 1 with the LC layer 10 therebetween.

Figure 2:
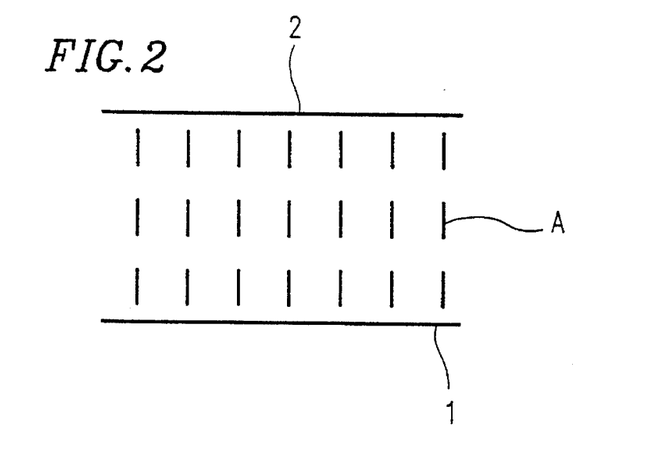
FIG. 2 is a sectional view showing the orientations of liquid crystal molecules at the non-application of an electric field for the LC electro-optic device of FIG. 1.
Figure 3A:
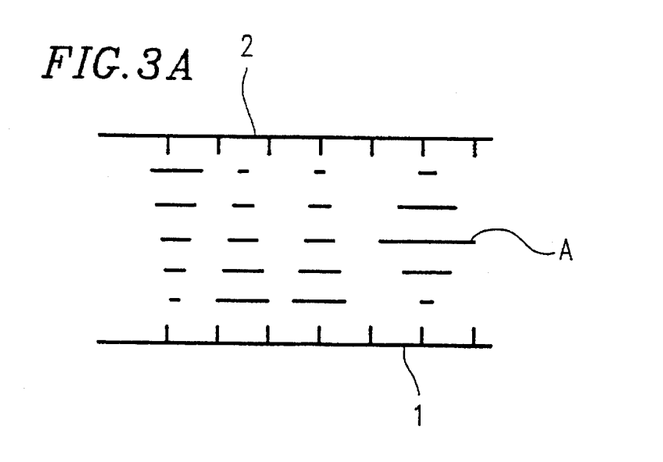
FIGS. 3A and 3B are sectional views showing the orientations of liquid crystal molecules at the application of an electric field for the LC electro-optic device of FIG. 1.

In the LC electro-optic device shown in FIG. 1, when the LC cell is not applied with an electric field, LC molecules A are aligned as shown in FIG. 2, in a direction perpendicular to the substrates 1 and 2. When the LC cell is applied with an electric field, the LC molecules A are aligned in a direction parallel to the substrates 1 and 2 and the orientations of the LC molecules A are continuously twisted by 90° along the thickness of the LC layer 10 between the substrates 1 and 2, as shown in FIG. 3A. The LC molecules are not necessarily aligned at right angles to the substrates when the LC cell is not applied with an electric field, but the same effect may be obtained by aligning the LC molecules at an angle in the range of 85° to 90° or 90° to 95°.

The LC electro-optic device shown in FIG. 1 is fabricated by the following method.

First, the substrate 1 having the structure as shown in FIG. 7 and the substrate 2 opposing the substrate 1 are fabricated using insulating material such as glass, quartz, or ceramic resin. At least one of the substrates 1 and 2 is transparent. The electrodes 3 and 4 are formed on the substrates 1 and 2 each by first forming a transparent conductive film made of indium tin oxide, tin oxide, or the like and then patterning the film to a predetermined shape. Other components such as the bus lines 19 and 20 and the switching elements are formed on the substrate 1 on which the electrodes 3 (the pixel electrodes 22 in FIG. 7) have been formed.

Thereafter, the alignment films 5 and 6 are formed over the surfaces of the substrates 1 and 2, for aligning the LC molecules in a direction perpendicular to the substrates 1 and 2. The alignment films 5 and 6 may be made of various types of materials. In this example, a material having a polyimide skeleton bonded with a long-chain alkyl group as a side chain, such as JALS-203 (manufactured by Nippon Synthetic Rubber) was used. Since the alignment films 5 and 6 made of such a material do not require any aligning treatment such as rubbing, the fabrication process can be simplified.

The spacers 7 having a diameter of 5 μm are scattered on the surface of one of the substrates 1 and 2, while the seals 8 and 9 are applied on portions of the other of the substrates 1 and 2 outside the display region. The substrates 1 and 2 are then attached together with the spacers 7 and the seals 8 and 9 being interposed therebetween, and n-type nematic liquid crystal doped with a chiral dopant adjusted so that the twist pitch of the liquid crystal is 20 μm is injected into a space formed between the substrates 1 and 2. The injection port is then sealed.

The resultant structure is heated up beyond a temperature at which the liquid crystal becomes an isotropic phase, and then cooled. Thus, the LC cell is completed.

According to the LC electro-optic device of this example, it is possible to inject liquid crystal into a space between the pair of substrates by the same method as that used for general LCDs, not requiring to inject liquid crystal in an isotropic phase, as in the case of the fabrication of the amorphous TN LCD described hereinbefore. This simplifies the fabrication process. A numerous types of liquid crystal and chiral dopants may be used for the LC electro-optic device of this example. In this example, ZLI-4788 (manufactured by Merck Japan) for the liquid crystal, having a negative dielectric anisotropy, and S-811 (manufactured by Merck Japan) for the chiral dopant were used. In the case where the temperature range used for the LC electro-optic device is considerably wide, a material inverting the temperature dependency of the helical twisting power of the chiral dopant may be mixed. The amount of the chiral dopant is adjusted so that the thickness of the LC layer 10 is in the range of 20% to 35% of the twist pitch of the liquid crystal.

The polarizers 11 and 12 are disposed on the outer surfaces of the resultant LC cell so that the polarizing axes thereof are vertical to each other, and thus the LC electro-optic device is completed.

In the LC electro-optic device of this example with the polarizers 11 and 12 disposed in the above manner, black display is exhibited when an electric field is not applied, while white display is exhibited when an electric field is applied, thus providing a higher contrast. In the case where high contrast is not required, the absorption axes of the polarizers 11 and 12 may be parallel to each other or in any directional relationship therebetween.

The alignment films 5 and 6 are not rubbed in the above-described fabrication process, but they may be rubbed as will be described below. In the latter case, the contrast and the luminance can be further improved when the polarizing axis of each of the polarizers 11 and 12 is made parallel or vertical to the rubbing direction of the adjacent alignment film 5 or 6. In the case where high contrast is not required, the polarizing axis may be in an arbitrary direction with regard to the rubbing direction of the alignment film.

Figure 4A:
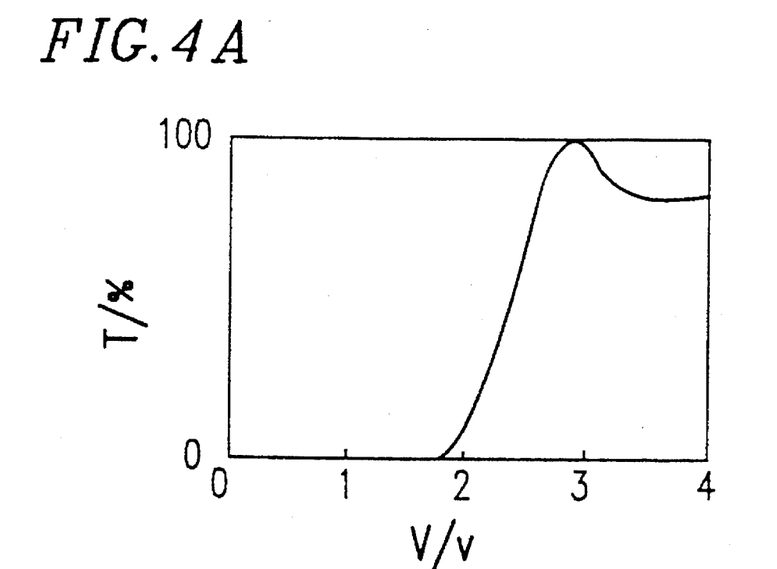
FIGS. 4A and 4B show the voltage-transmittance curves of the LC electro-optic device of FIG. 1.

FIG. 4A shows the voltage-transmittance curve obtained when the LC electro-optic device of this example is viewed from the front at a room temperature. The x-axis represents the voltage V (V) and the y-axis represents the transmittance T (%). As is observed from FIG. 4A, the LC electro-optic device of this example is of a normally black type, and was able to be driven at a low driving voltage with a threshold voltage of approximately 2 V and a voltage providing a maximum transmittance of approximately 3 V. The contrast ratio was approximately 1100. The transmittance at the white display was almost the same as that obtained by the conventional TN-LC electro-optic device. Thus, high-luminance and high-contrast display was realized. The LC electro-optic device of this example also exhibited substantially uniform contrast over the entire display screen, thereby providing a good viewing angle characteristic.

The high contrast was maintained without any deterioration in the contrast due to a leak current at the TFTs and a lowered resistivity of the liquid crystal, thereby providing high reliability.

Since the LC electro-optic device of this example exhibited black display when an electric field was not applied, light was not leaked from a space between the adjacent pixel electrodes 22, i.e., between the adjacent pixels. Accordingly, a black matrix (BM) for blocking the leaked light was not required to be formed between the pixels as a shading film. This enlarged the aperture of the device, and thus high-luminance display was possible. Also, since the black display was not affected by a leak current at the TFTs 21 (see FIG. 7) as the switching elements, the deterioration in the contrast was prevented, maintaining a high contrast.

Thus, as described above, the LC electro-optic device of this example overcomes the conventional disadvantages on the display mode, and provides high-luminance and high-contrast display at a reduced driving voltage.

Figure 5:
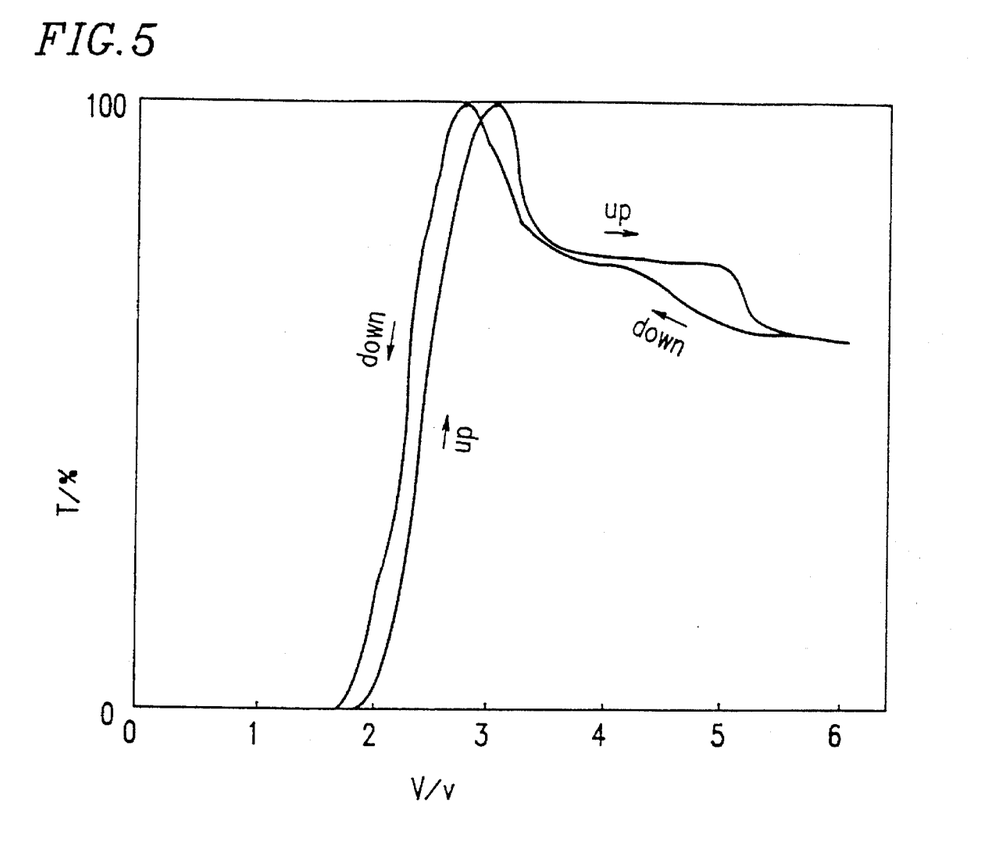
FIG. 5 shows hysteresis observed when an excess electric field is applied to the LC electro-optic device of FIG. 1.

In the LC electro-optic device fabricated by the above-described method, a hysteresis phenomenon has been observed, where, when an electric field larger than a voltage providing a maximum transmittance of the LC cell is applied, the transmittance obtained when the electric field is increases is different from that when it reduces. For example, the voltage-transmittance curve obtained when the voltage applied to the LC cell is gradually increased to reach 6 V and then gradually decreased is as shown in FIG. 5. This phenomenon does not occur when the maximum voltage applied to the LC cell is equal to or less than the voltage providing a maximum transmittance of the LC cell. The hysteresis phenomenon becomes significant when the applied voltage exceeds 1.1 times or less the voltage providing a maximum transmittance of the LC cell (3.3 V for the device of this example). As a result, it is desirable to apply an electric field 1.1 times or less the electric field providing a maximum transmittance of the LC cell.

When the alignment films 5 and 6 are not rubbed as in the above fabrication process, the viewing angle characteristic of the LC cell is symmetrical with regard to the horizontal and vertical axes thereof. However, the contrast inversion occurs from a point of an inclination of approximately 30° with regard to the normal of the substrates of the LC cell. For this reason, when the LC electro-optic device fabricated by the above-described process is used as a direct-view type display, it is suitable to be used especially as a personal-use display. The alignment films 5 and 6 may be rubbed in the fabrication process of the LC electro-optic device of this example. In this case, the symmetricity of the viewing angle characteristic is reduced, but the uniformity of the contrast at the application of an electric field can be improved.

As described hereinbefore, a material having a polyimide skeleton bonded with a long-chain alkyl group, i.e., polyimide having an alkyl group as a side chain is used for the alignment films 5 and 6. This material provides a specific effect as follows: The polyimide having a side chain is excellent in the reliability of the pretilt angle. Since no ionic substances are seeped into the liquid crystal, this material is also excellent in the reliability of the voltage retention representing the specific resistance of liquid crystal. This makes it possible to provide an LC electro-optic device where the display quality does not deteriorate over a long-term use. The side chain is not limited to the alkyl group, but any group may be used as far as it causes the LC molecules to be aligned in a direction substantially perpendicular to the substrates.

Figure 3B:
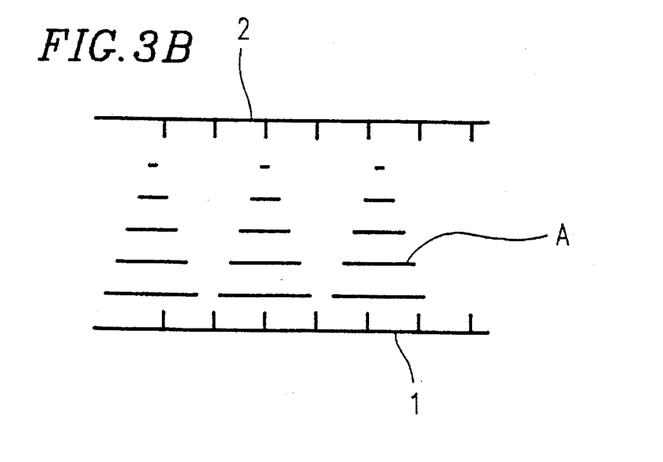
Figure 4B:
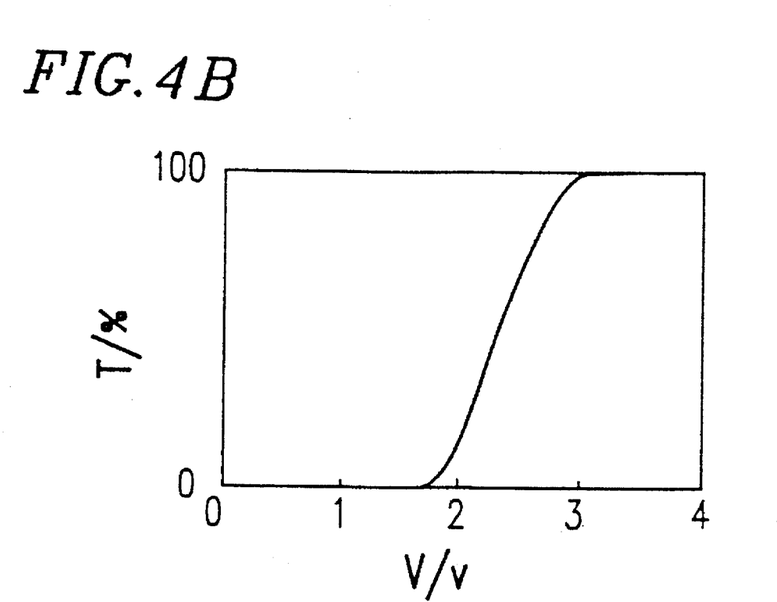

The alignment films 5 and 6 may be rubbed so that the orientations of the LC molecules are twisted by 90° along the thickness of the LC layer between the pair of substrates. The orientations of the LC molecules are more strictly controlled when the alignment films 5 and 6 are rubbed than when they are not rubbed, realizing substantially complete 90° twisting. FIG. 3B shows the orientation of the LC molecules at the application of an electric field to the LC layer 10 for the LC electro-optic device where the alignment films 5 and 6 are rubbed. FIG. 4B shows the voltage-transmittance curve of such an LC electro-optic device. As is observed from FIG. 4B, when the alignment films 5 and 6 are rubbed, the hysteresis phenomenon does not occur even when the electric field applied to the LC cell exceeds an electric field 1.1 times the electric field providing a maximum transmittance of the LC cell. This facilitates the driving of the LC electro-optic device, and thus improves the response characteristic of the liquid crystal.

The LC electro-optic device of the present invention may be made of various types of materials other than those described in the above example. In the above example, the present invention was described taking the LC electro-optic device using TFTs as an example. The same effect can also be obtained for a simple matrix LC electro-optic device. The present invention is also applicable to an LC electro-optic device using active elements other than TFTs such as MIM elements. The present invention is further applicable to an LC electro-optic device using TFTs formed of any of amorphous silicon, polysilicon, crystallized silicon, or the like.

A transmissive LC electro-optic device with two polarizers disposed on the outer surfaces of the LC cell was described in the above example. The present invention is also applicable to an LC electro-optic device provided with a polarizer on one outer surface of the LC cell and a reflector on the other outer surface thereof. The present invention is further applicable to an LC electro-optic device which is provided with an polarizer on one outer surface of the LC cell and uses an electrode formed on a substrate located opposite to the polarizer as a reflector. The LC electro-optic device of the present invention can also be modified as an LC electro-optic device for color display by combining with color filters, and the like.

EXAMPLE 2

An example of a projection-type display system obtained by combining the LC electro-optic device fabricated by the process described in Example 1 with a projection lens and a light source is described as the second example of the present invention.

Figure 6:
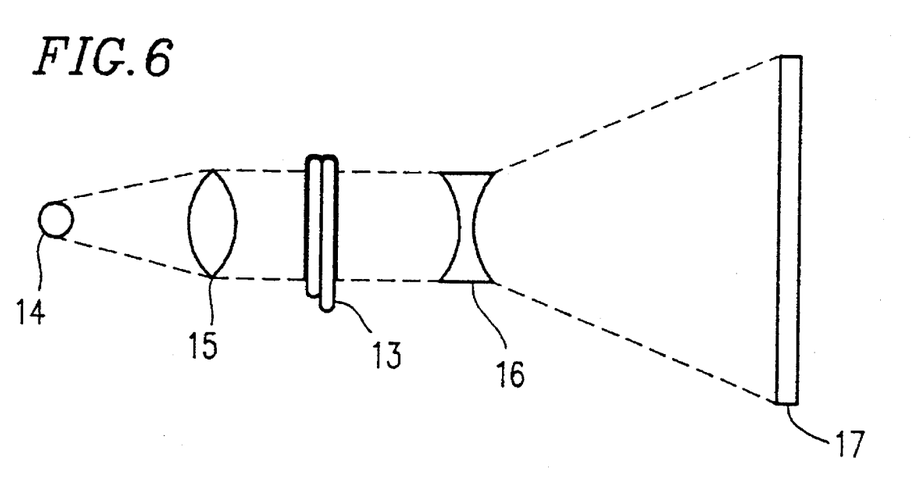
FIG. 6 shows a projection-type display system employing an LC electro-optic device according to the present invention.

FIG. 6 shows a configuration of the projection-type display system of this example. The projection-type display system includes an LC electro-optic device 13 fabricated by the process described in Example 1. A lens 15 for optical axis correction and a light source 14 are disposed on one side of the LC electro-optic device 13, with the former being nearer to the LC electro-optic device 13. A projection lens 16 is disposed on the other side of the LC electro-optic device 13 for projecting images and the like displayed on the LC electro-optic device 13 onto a screen 17. In such a projection-type display system, since a viewer views images and the like projected on the screen 17, a wide viewing angle is not required. Accordingly, with the projection-type display system of this example, the excellent characteristics of the LC electro-optic device 13 fabricated by the process described in Example 1, such as the low driving voltage, high luminance, high contrast, and good viewing angle characteristic can be best utilized.

The projection-type display system of Example 2 represents a most simplified configuration. The system shown in FIG. 6 may be combined with various lenses including microlenses, a prism, a reflector, a color filter, a dichromic mirror, and the like, as required. Additional one or more LC electro-optic device(s) 13 may also be disposed.

As is apparent from the above description, according to the present invention, an LC electro-optic device capable of providing high-luminance and high-contrast display at a low driving voltage and with a uniform viewing angle characteristic over the entire display screen can be obtained. This LC electro-optic device can be effectively used for personal-use displays, information processors, projection-type display systems, and the like. The LC electro-optic device of the present invention does not necessarily require aligning treatment (rubbing) which is generally required at the fabrication of conventional TN-LCDs. A special procedure for the injection of liquid crystal as in the case of the conventional amorphous TN-LCDs is not required, but a normal procedure can be employed. This provides advantages in the process cost and the throughput, making it possible to obtain a less expensive device.

When the alignment films are subjected to an aligning treatment, the alignment of the liquid crystal can be more strictly controlled, realizing substantially complete 90° twisting along the thickness of the LC layer between the pair of substrates. Also, when polyimide having a side chain is used as the material for the alignment films, the display quality is prevented from deteriorating for a long-term use.

The projection-type display system of the present invention effectively utilizes the advantages of the LC electro-optic device, such as the low driving voltage, high luminance, high contrast, and good viewing angle characteristic.

The method for driving the LC electro-optic device according to the present invention prevents the hysteresis phenomenon from occurring in the LC electro-optic device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal electro-optic device comprising:

a pair of insulating substrates disposed to face each other;

a liquid crystal layer sandwiched between the pair of insulating substrates, a polarization plane of light incident thereon changing in accordance with a twist orientation of liquid crystal molecules in the liquid crystal layer;

a pair of alignment films respectively formed on the pair of insulating substrates to be in contact with the liquid crystal layer; and a pair of polarizers disposed to sandwich the pair of the insulating substrates, the pair of polarizers being arranged so that polarizing axes thereof are substantially perpendicular to each other, wherein orientations of liquid crystal molecules in the liquid crystal layer, which are in contact with the pair of alignment films, are aligned in a direction substantially perpendicular to the pair of insulating substrates, wherein the liquid crystal layer has a twist pitch of approximately quadruple the thickness of the liquid crystal layer, and wherein the pair of alignment films are respectively rubbed, and the polarizing axes of the pair of polarizers are parallel to or perpendicular to a direction in which an adjacent one of the alignment films is rubbed.

2. A method for driving a liquid crystal electro-optic device as claimed in claim 1, comprising a step of applying a voltage across the liquid crystal layer of a magnitude whereby the resultant electric field is equal to or less than 1.1 times the electric field existing when the liquid crystal layer is at its maximum transmittance.

3. A liquid crystal electro-optic device comprising:

a pair of insulating substrates disposed to face each other;

a liquid crystal layer sandwiched between the pair of insulating substrates, a polarization plane of light incident thereon changing in accordance with a twist orientation of liquid crystal molecules in the liquid crystal layer;

a pair of alignment films respectively formed on the pair of insulating substrates to be in contact with the liquid crystal layer; and a pair of polarizers disposed to sandwich the pair of the insulating substrates, the pair of polarizers being arranged so that polarizing axes thereof are substantially perpendicular to each other, wherein orientations of liquid crystal molecules in the liquid crystal layer, which are in contact with the pair of alignment films, are aligned in a direction substantially perpendicular to the pair of insulating substrates, wherein the pair of alignment films are respectively rubbed, and the polarizing axes of the pair of polarizers are parallel to or perpendicular to a direction in which an adjacent one of the alignment films is rubbed, and wherein the thickness of the liquid crystal layer is in the range of 20 to 35% of a twist pitch of the liquid crystal layer.

4. A liquid crystal electro-optic device according to claim 3, wherein the liquid crystal layer includes a nematic liquid crystal having a negative dielectric anisotropy.

5. A liquid crystal electro-optic device according to claim 3, wherein the liquid crystal layer includes a liquid crystal doped with a chiral dopant to make the orientations of the liquid crystal molecules in the liquid crystal layer twisted.

6. A liquid crystal electro-optic device according to claim 3, wherein the orientations of the liquid crystal molecules are twisted by substantially 90 degrees along the thickness of the liquid crystal layer when an electric field is applied to the liquid crystal layer.

7. A liquid crystal electro-optic device according to claim 3, wherein the pair of alignment films are vertical alignment films for aligning the orientations of the liquid crystal molecules which are in contact with the vertical alignment films, one of the vertical alignment films is rubbed in a first direction, the other of the vertical alignment films is rubbed in a second direction, and the vertical alignment films are arranged so that the first direction is shifted from the second direction by substantially 90 degrees.

8. A liquid crystal electro-optic device according to claim 7,
wherein the pair of polarizers are arranged so that a polarizing axis of one of the polarizers, which is adjacent to the alignment film which is rubbed in the first direction, is parallel to or perpendicular to the first direction, and a polarizing axis of the other of the polarizers, which is adjacent to the alignment film which is rubbed in the second direction, is parallel to or perpendicular to the second direction.

9. A liquid crystal electro-optic device according to claim 7, wherein one of the polarizing axes of the pair of polarizers is substantially parallel to the first direction and the other of the polarizing axes of the pair of polarizers is substantially parallel to the second direction.

10. A liquid crystal electro-optic device according to claim 3, wherein the pair of alignment films are formed of a material which contains polyimide having a side chain.

11. A projection-type display system comprising a light source, an electro-optic device for receiving light from the light source and displaying an image, and a projection lens for projecting the image displayed by the electro-optic device, the light source and the projection lens being disposed to sandwich the electro-optic device, the electro-optic device comprising:

a pair of insulating substrates disposed to face each other;

a liquid crystal layer sandwiched between the pair of insulting substrates, a polarization plane of light incident thereon changing in accordance with a twist orientation of liquid crystal molecules in the liquid crystal layer;

a pair of alignment films respectively formed on the pair of insulating substrates to be in contact with the liquid crystal layer; and a pair of polarizers disposed to sandwich the pair of the insulating substrates, the pair of polarizers being arranged so that the polarizing axes thereof are substantially perpendicular to each other, wherein orientations of liquid crystal molecules in the liquid crystal layer, which are in contact with the pair of alignment films, are aligned in a direction substantially perpendicular to the pair of insulating substrates, wherein the thickness of the liquid crystal layer is in the range of 20% to 35% of a twist pitch of the liquid crystal layer, and wherein the pair of alignment films are respectively rubbed, and the polarizing axes of the pair of polarizers are parallel to or perpendicular to a direction in which an adjacent one of the alignment films is rubbed.

* * * * *